United States Patent [19]
Jones et al.

[11] Patent Number: 5,726,640
[45] Date of Patent: Mar. 10, 1998

[54] SYSTEM AND METHOD FOR SCHEDULING THE TRANSMISSION OF PAGES HAVING DIFFERENT PROTOCOLS

[75] Inventors: Thomas Mark Jones, Keller; W. Garland Phillips, Arlington, both of Tex.

[73] Assignee: Motorola, Inc., Schaumburg, Ill.

[21] Appl. No.: 538,913

[22] Filed: Oct. 4, 1995

[51] Int. Cl.$^6$ .............................. H04Q 1/00; H04Q 7/00; H04Q 7/18; G08B 5/22
[52] U.S. Cl. .................. 340/825.22; 340/825.44; 340/825.03; 340/825.5; 370/313; 370/314; 455/150.1; 455/150.2
[58] Field of Search ............ 340/825.22, 825.44, 340/825.71, 825.72, 825.03, 825.5; 455/33.1, 33.4, 150.1, 151.2, 49.1, 53.1, 54.1, 38.1; 379/56, 57; 370/313, 314

[56] References Cited

U.S. PATENT DOCUMENTS

| | | | |
|---|---|---|---|
| 5,227,775 | 7/1993 | Bruckert et al. | 340/825.25 |
| 5,475,380 | 12/1995 | Shim | 340/825.44 |
| 5,487,100 | 1/1996 | Kane | 379/57 |
| 5,493,286 | 2/1996 | Grube et al. | 340/825.44 |
| 5,517,491 | 5/1996 | Nanni et al. | 370/29 |
| 5,521,926 | 5/1996 | Ayerst et al. | 370/953 |
| 5,530,437 | 6/1996 | Goldberg | 340/825.08 |
| 5,530,918 | 6/1996 | Jasinski | 455/56.1 |
| 5,537,407 | 7/1996 | Park et al. | 370/79 |
| 5,550,872 | 8/1996 | Liberti, Jr. et al. | 375/347 |
| 5,592,154 | 1/1997 | Lin et al. | 340/825.5 |
| 5,598,148 | 1/1997 | Koechler | 340/825.21 |

*Primary Examiner*—Michael Horabik
*Assistant Examiner*—Yonel Beaulieu
*Attorney, Agent, or Firm*—Pablo Meles

[57] ABSTRACT

A paging controller (10) schedules the transmission of pages of different protocol types, dynamically, taking into account both the airtime efficiency of transmitting a page of a particular protocol type and the fairness of transmitting pages of that protocol type. The paging controller (10) determines the efficiency of transmitting stored pages for each protocol type based upon the number of code words stored for the pages of the protocol type in a paging queue (27-30) and based upon the delay, if any, that is expected to be encountered in changing to the protocol type. The paging controller (10) determines the fairness of transmitting pages of a particular protocol type based upon the age of the pages of the protocol type that are stored in the paging queue (27-30). The paging controller (10) schedules and encodes only up to a predetermined limited number of batches/frames of pages of the selected protocol type so that if pages of a different protocol type are received by the paging controller (10) that are determined to be more efficiently and fairly transmitted than the currently selected paging type, the paging controller (10) can quickly change to the protocol type of the newly received pages.

18 Claims, 10 Drawing Sheets

1

SYSTEM AND METHOD FOR SCHEDULING THE TRANSMISSION OF PAGES HAVING DIFFERENT PROTOCOLS

FIELD OF INVENTION

The present invention relates to a system and method for scheduling the wireless transmission of received messages such as pages having different signalling protocols and more particularly to such a system and method wherein scheduling is dynamically determined based upon both efficiency and fairness.

BACKGROUND OF THE INVENTION

Known paging controllers schedule the transmission of received pages to the intended pagers in accordance with various page scheduling algorithms. One known page scheduling algorithm schedules the transmission of all pages having the same signalling protocol until there are no more pages of that protocol type to transmit. It is only after the transmission of all of the pages for a given protocol that the page scheduler will allow pages of a different protocol type to be scheduled for transmission. The decisions as to which type of page to transmit next are made based primarily upon the protocol type of the oldest page that is being stored for transmission. That is, the page scheduling algorithm determines the protocol of the oldest page that is stored and schedules all of the pages having that type of protocol for transmission next regardless of the airtime efficiency thereof. One known system is such that a batch of pages of a particular protocol type is transmitted whenever the number of full batches received for that protocol type equals a predetermined number or when the maximum time for holding pages of that protocol type has expired. Other known systems have employed a round robin technique for scheduling pages. However, like the other prior page schedulers, these techniques do not dynamically consider the efficiency of sending pages. Known page schedulers are also inflexible in that the operator of the scheduler has no ability to influence the decision of which page is to be transmitted next.

SUMMARY OF THE INVENTION

In accordance with the present invention, the disadvantages of prior page scheduling systems and methods have been overcome. The system and method of the present invention schedules the wireless transmission of messages dynamically, taking into account both the efficiency of transmitting a message of a particular protocol type and the fairness of transmitting messages of that protocol type.

More particularly, when messages are received for wireless transmission, a controller stores the messages in accordance with the protocol type of the message. The controller determines the efficiency of transmitting stored messages for each protocol type based upon the length of the messages of the protocol type and any delay expected to be encountered in changing to the protocol type. The controller also determines the fairness of transmitting the stored messages for each protocol type based upon the age of the messages of the protocol type that are stored. The controller selects the messages to be scheduled for transmission next based upon which messages can be transmitted most efficiently and fairly. The controller then schedules up to a predetermined, limited number of the selected messages.

These and other advantages and novel features of the present invention, as well as details of an illustrated embodiment thereof, will be more fully understood from the following description and drawings.

DESCRIPTION OF THE PREFERRED EMBODIMENT

Figure 1:
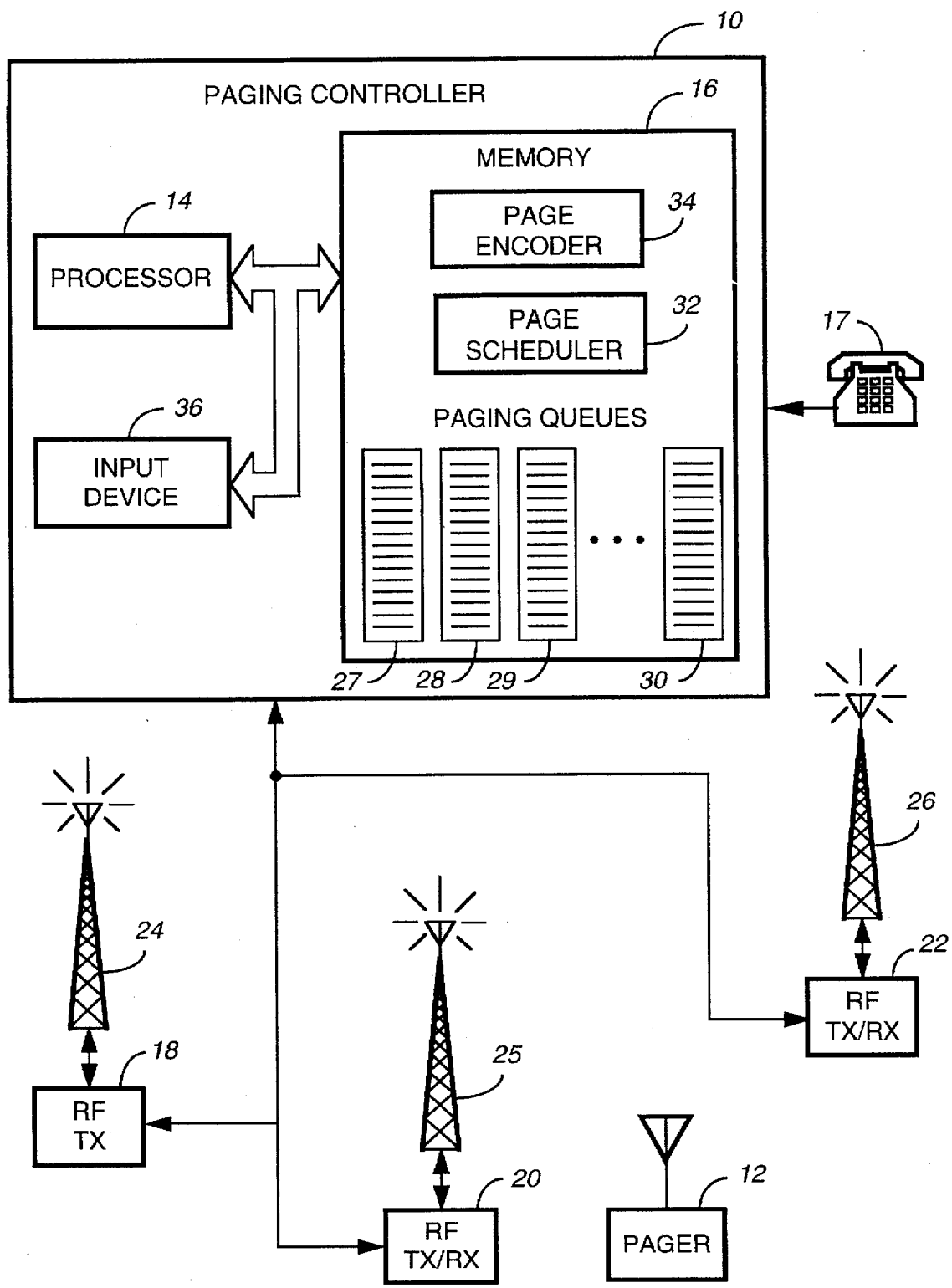
FIG. 1 is a block diagram of a paging network having a paging controller that schedules the transmission of pages having different types of paging protocols in accordance with the present invention.

A wireless communication network is illustrated in FIG. 1 for scheduling the transmission of messages stored in a controller 10 to a portable communication device 12. The communication network may be, for example, a paging network with a paging controller 10 as shown in FIG. 1 wherein the portable communication device 12 may be either a one-way or two-way pager; although the invention is not limited thereto. The paging controller 12 includes a processor 14 that operates in accordance with software stored in a memory 16 and that utilizes a scratch pad portion of the memory 16 to control the scheduling and encoding of paging messages received from an input device such as a telephone 17. The received pages are scheduled for transmission to an intended pager on an assigned radio frequency (R.F.) channel via one or more selected transmitter units 18 or transmitter/receiver units 20, 22 having a respective antenna 24–26. Only three transmitter units are shown in FIG. 1 for simplicity, there typically being a large number of transmitter units coupled to a single paging controller 10. The transmitter units that are coupled to the paging controller 10 are preferably organized in zones. A zone is a paging area that consists of one or more transmitter units wherein control messages, and if desired the paging messages themselves, are simulcast by all of the transmitter units in a zone.

The paging controller 10 is responsive to a paging message received from an input device such as the telephone 17 to store the paging message in a respective paging queue 27, 28, 29, 30 that is associated with the signalling protocol of the message. The signalling protocol of a received message is determined by the paging controller from the type of pager 12 for which the message is intended to be sent. The paging controller 10 in accordance with the present invention schedules and encodes paging messages in a number of different paging protocols such as the known paging protocols POCSAG, FLEX, etc.

The processor 14, operating in accordance with page scheduler software routines 32 stored in the memory 16, determines which type of pages, i.e. pages of which signalling protocol, are to be scheduled next for transmission in accordance with both efficiency and fairness considerations. A limited, predetermined number of page batches/frames of the selected page type are scheduled by the page scheduler 32 for encoding into the selected signalling protocol by the processor 14 operating in accordance with a respective page encoder routine 34. Only a limited number of batches of the selected page type are encoded for transmission at a given time so that the paging controller 10 can determine if recently received pages of a paging type that is different from the last scheduled paging type can more efficiently use the airtime while taking into account the fairness of transmitting pages of that page type. Thus, the paging controller 10 dynamically determines the most efficient and fair pages to be transmitted on an ongoing basis as more pages are received by the controller 10 as opposed to sending all of one type of page after a selection is made as in prior systems. The increased efficiency of the system of the present invention results in large cost savings without jeopardizing the fairness of the operation. As discussed in detail below, the efficiency determination is based on the length of the pages that are stored in association with a particular signalling protocol as well as on the delay that is expected to be encountered in changing from the current paging type to a different paging type due to a number of overhead factors. These overhead factors may include the need to send a preamble and/or leader tones as well as any transmission delays expected to be encountered, for example, as based upon the availability of a R.F. channel and/or transmitter unit(s) in the zone in which the pages of the particular protocol type are to be sent. The paging controller 10 in accordance with the scheduler 32 makes a weighted decision as to which type of pages are to be scheduled for transmission next wherein the weight given to efficiency and fairness is user programmable via an input device 36 such as a keyboard. By allowing the user to select the respective weight to be given to efficiency and fairness, the operator can directly influence which pages are to be transmitted next. Thus, the paging controller operating in accordance with the page scheduler 32 of the present invention is extremely flexible as well as cost-efficient.

Figure 2:
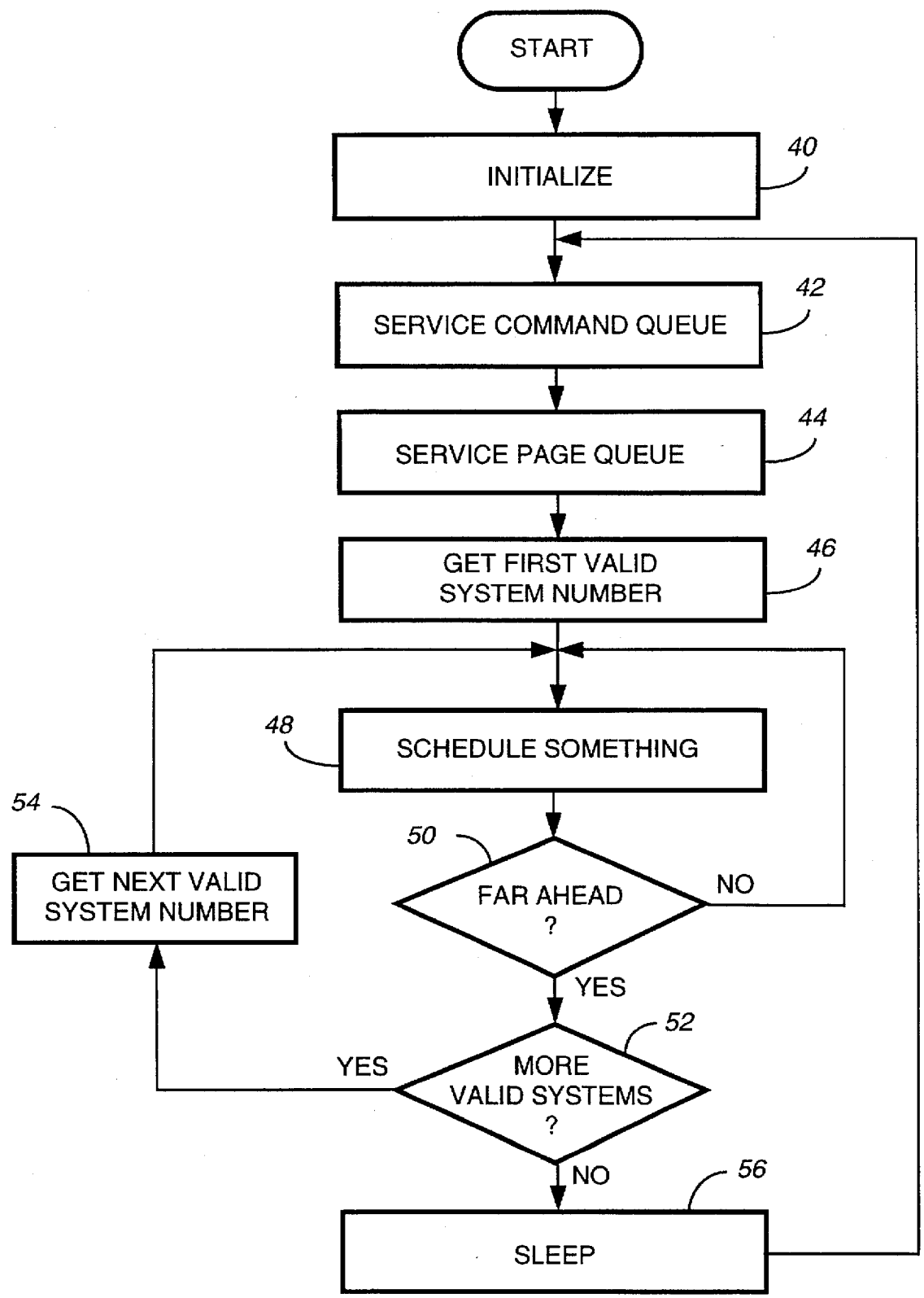
FIG. 2 is a flow chart illustrating a main scheduling routine implemented by the paging controller of FIG. 1.

The main routine of the page scheduler 32 is depicted in FIG. 2. Upon entering the routine, the processor 14 initializes the scheduler routine at block 40. Thereafter, at block 42 the processor 14 implements the Service Command Queue routine shown in FIG. 3 so as to schedule for transmission any command messages stored in a command queue in the memory 16. Command messages are those messages that are required to be simulcast by the transmitter units such as control information for synchronization, alarms, etc. The processor 14 then proceeds to block 44 to implement the Service Page Queue routine shown in FIG. 4 so as to store information identifying received pages in the proper paging queue i.e. the queue associated with the signalling protocol according to which the received page is to be encoded. The processor 14 at block 46 obtains the identity of a first system or group of transmitter units that are capable of simulcasting information. Thereafter, the processor 14 at block 48 implements the routine depicted in FIGS. 5-7 so as to schedule a limited number of batches of a selected page type for transmission on a radio frequency channel in an identified zone of the system. At block 50, the processor 14 determines whether it is scheduling page batches too far in advance. It is important that the processor 14 does not schedule page batches too far in advance because new pages might be received that can be more efficiently transmitted than the pages that were considered in earlier scheduling determinations but not transmitted as yet. If the processor 14 determines that it is scheduling too far in advance for one system, the processor proceeds from block 50 to block 52 to determine whether there are other systems coupled to the controller for which pages must be scheduled. If so, the processor proceeds from block 52 to block 54 to obtain the identity of the next system or group of transmitter units for which pages are to be scheduled. Thereafter, the processor 14 proceeds back to block 48 for the scheduling of page batches for transmission in the system identified at block 54. After the scheduling of pages for each of the systems coupled to the paging controller 10, the processor 14 proceeds to block 56 to sleep before returning to block 42.

Figure 3:
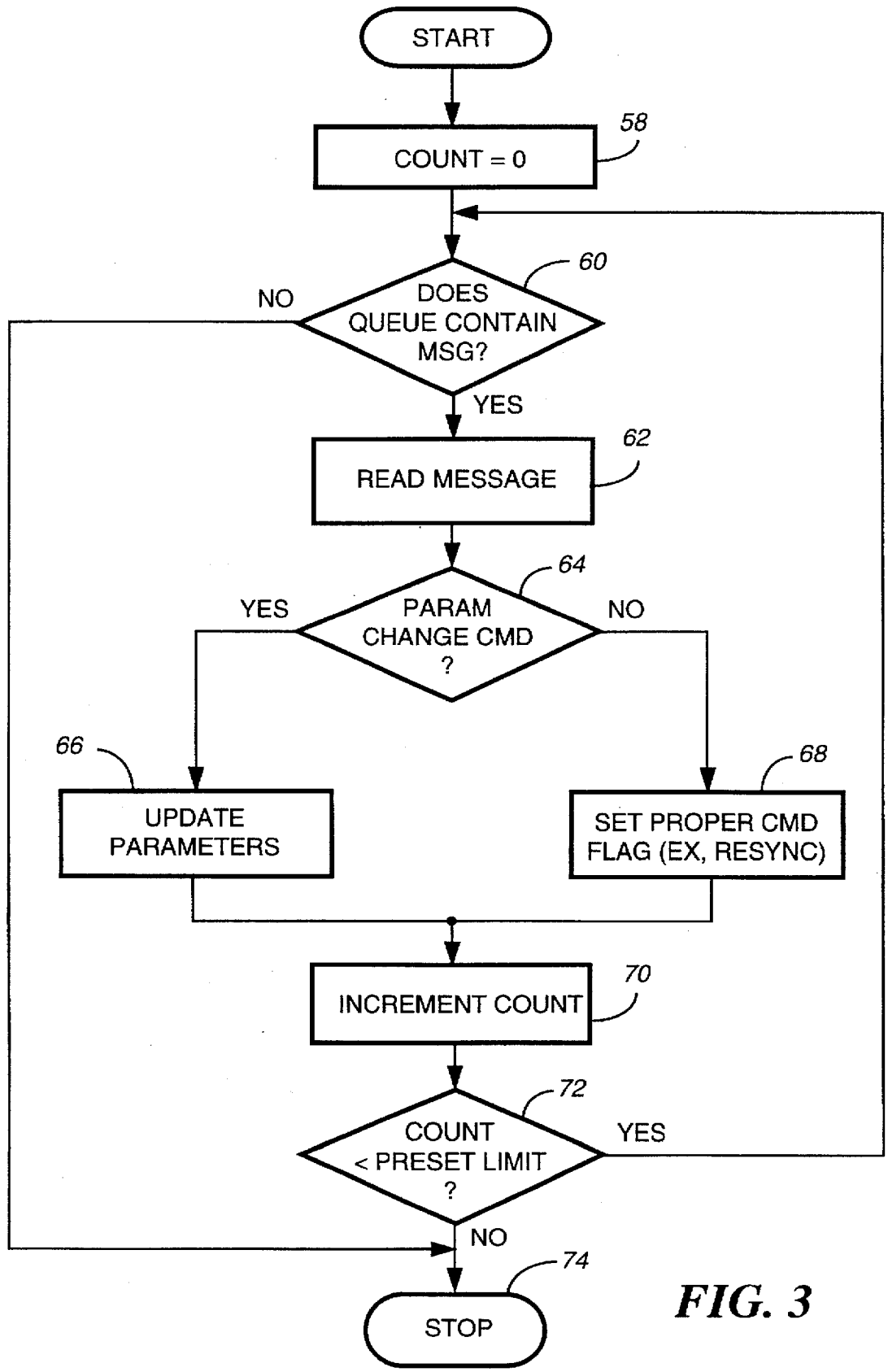
FIG. 3 is a flow chart illustrating the service command queue subroutine of FIG. 2.

In order to service the command message queue of the memory 16, the processor 14 as shown in FIG. 3 initializes a counter to zero at block 58. Thereafter, the processor 14 determines at block 60 whether the command message queue contains any command messages. If so, the processor 14 proceeds to block 62 to read a command message. Thereafter, at block 64 the processor 14 determines whether the read message is the parameter change command. If so, the processor proceeds to block 66 to update the parameter specified in the command. If the processor determines at block 64, that the read message was not a parameter change command, the processor proceeds to block 68 to set the proper command flag that is associated with the read message. From either of blocks 66 or 68, the processor 14 proceeds to block 70 to increment the counter initialized at block 58. Thereafter, at block 72 the processor 14 determines whether the count is less than a preset limit wherein the preset limit is set to a value to limit the number of commands processed at a given time. If the count incremented at block 70 is less than the preset limit, the processor proceeds back to block 60 to determine whether the command message queue contains any more command messages and if so to service those messages. Otherwise, the processor 14 exits the routine at block 74.

Figure 4:
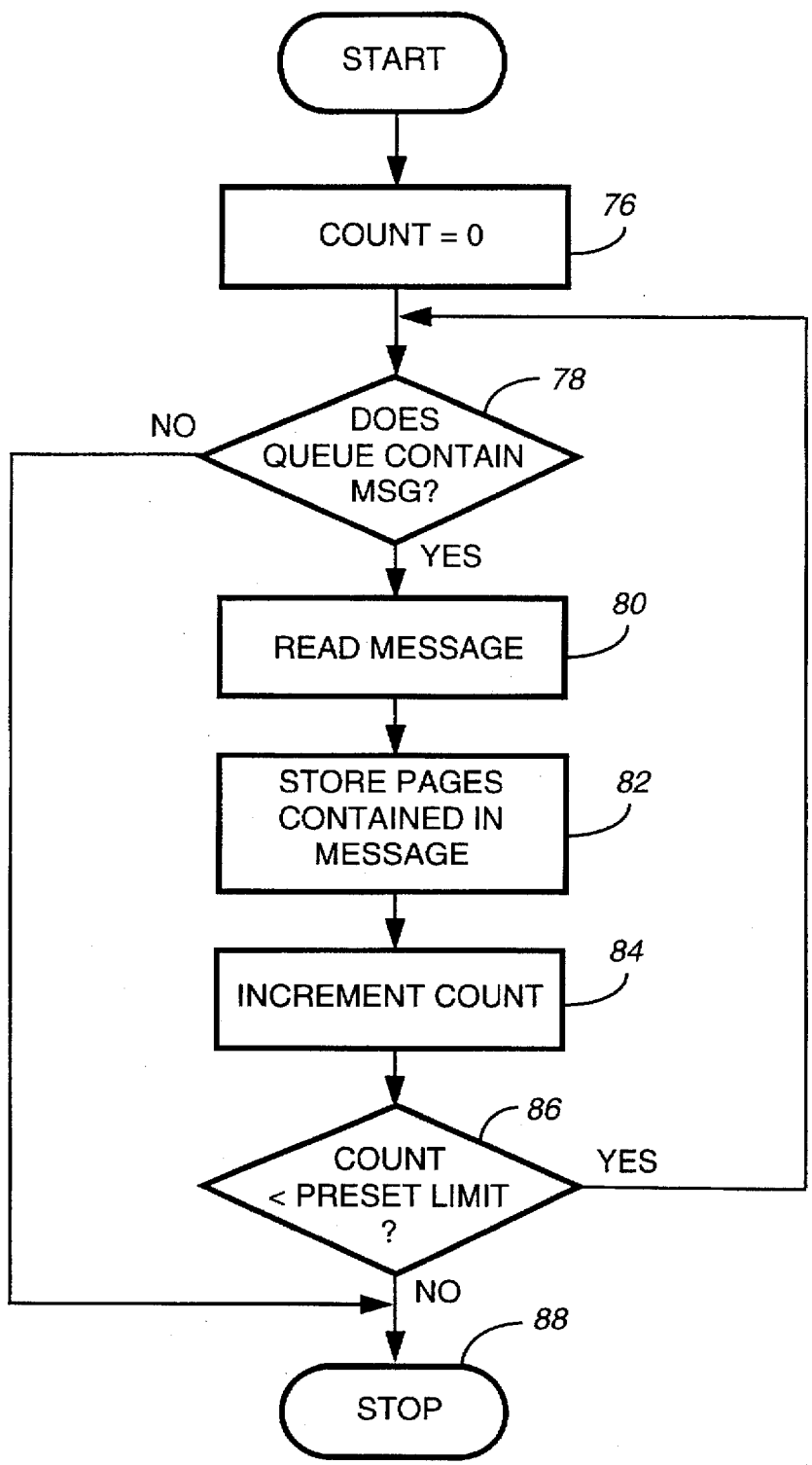
FIG. 4 is a flow chart illustrating a service page queue subroutine of FIG. 2.

The processor 14 services the page message queue in accordance with the flow chart depicted in FIG. 4. Upon entering the routine, the processor 14, at block 76, initializes a counter to zero. Thereafter, the processor 14 determines at block 78 whether the page message queue contains any page messages. If so, the processor proceeds to block 80 to read a page message contained in the queue so as to ascertain the location in the memory 16 of the page associated with the read message. Thereafter, at block 82 the processor 14 stores information identifying the page in the proper page queue i.e. the queue associated with the signalling protocol according to which the page is to be encoded for transmission to its intended pager 12. At block 84, the processor 14 then increments the counter and at block 86 determines whether the incremented count of the counter is less than a preset limit. If the count of the counter is less than the preset limit, the processor 14 proceeds back to block 78 to process another page message contained in the page message queue. Otherwise, the processor 14 proceeds from block 86 to block 88 to exit the routine.

Figure 5:
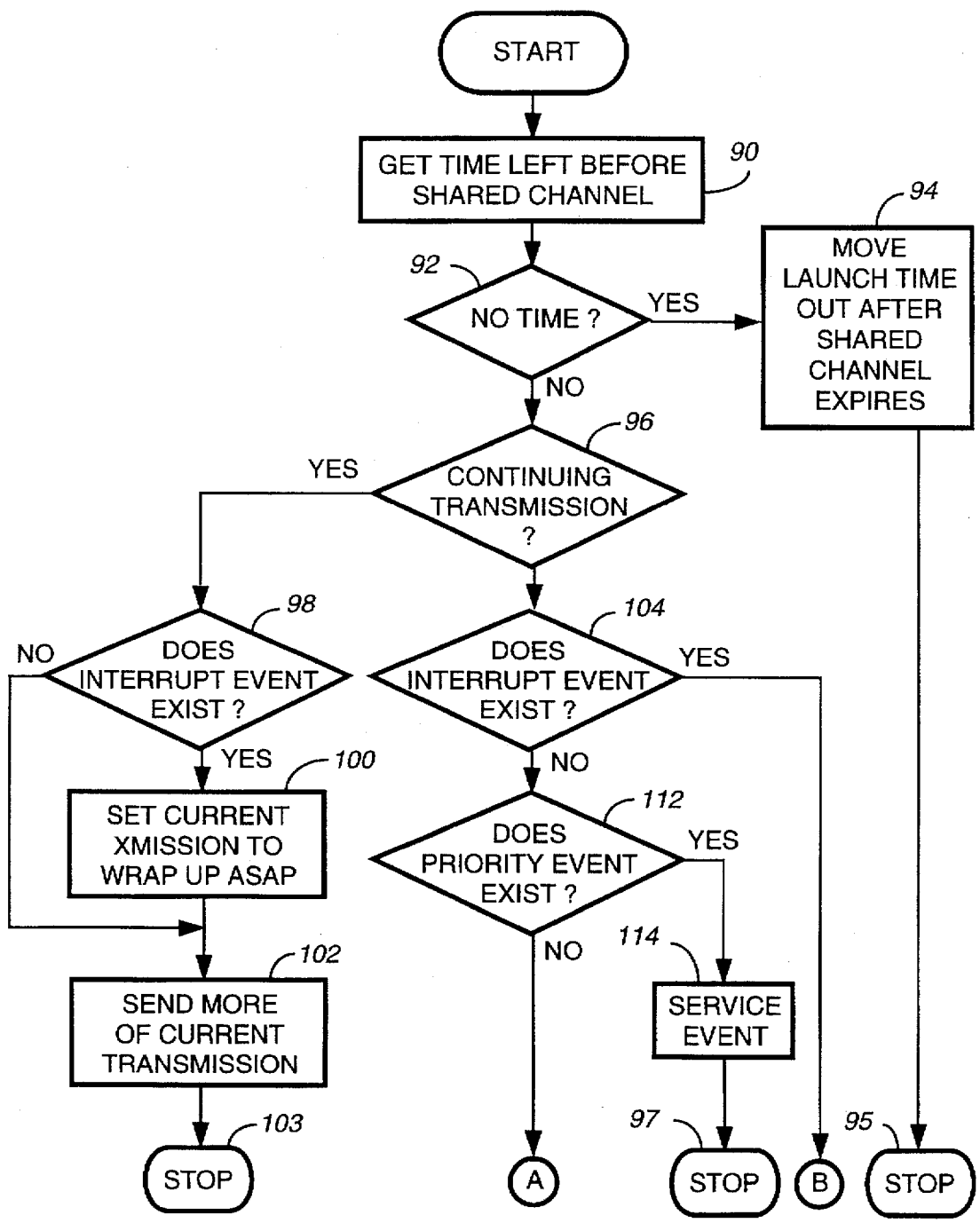
FIGS. 5–7 form a flow chart illustrating the scheduling subroutine of FIG. 2.
Figure 6:
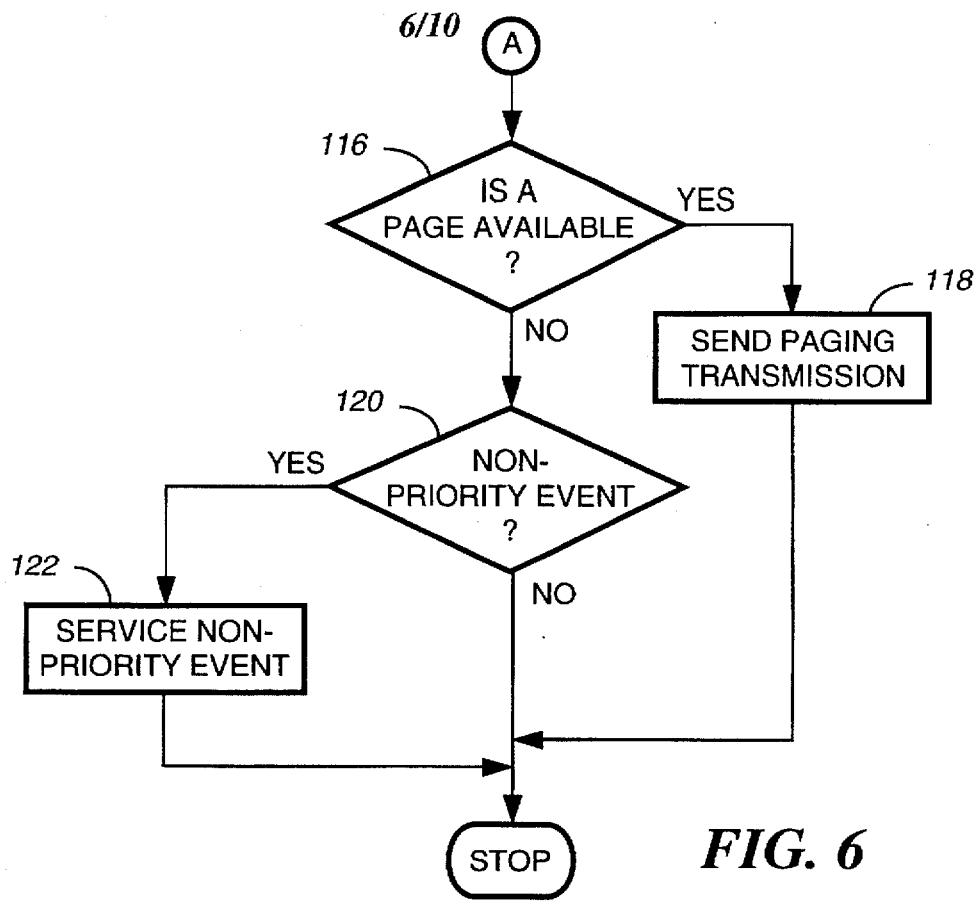
Figure 7:
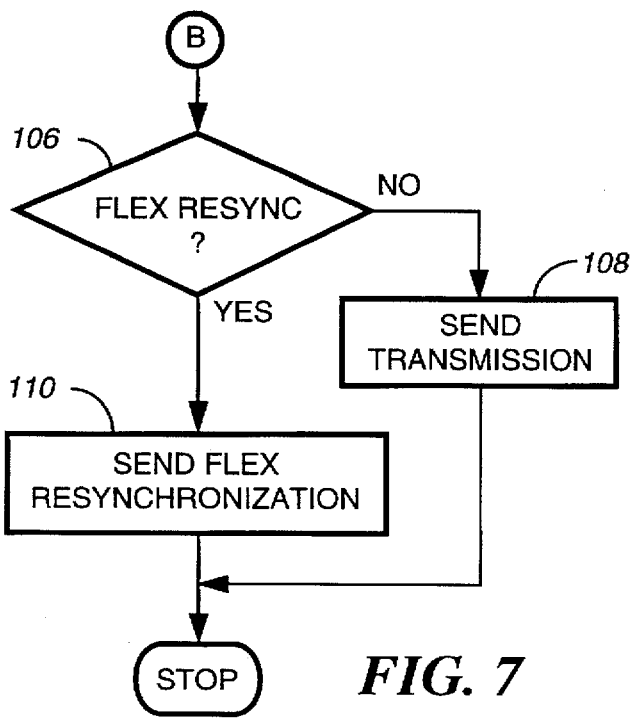

The processor 14 operates in accordance with the flow chart of FIGS. 5-7 in order to schedule a predetermined limited number of batches of pages to be transmitted to an intended pager. The paging controller 10 has an assigned time in which to schedule the transmission of pages wherein that assigned time cannot be extended over into a shared channel time. Therefore, at the start of the scheduler routine, the processor 14 retrieves at block 90 the amount of time left before the shared channel i.e. the amount of time remaining in which the paging controller 10 can schedule pages for transmission. If there is not enough time left for the scheduling and transmission of pages as determined by the processor 14 at block 92, the processor 14 proceeds to block 94 to move the starting time for scheduling after the shared channel time has expired. Thereafter, the processor 14 exits the subroutine at block 95. If the processor 14 determines that there is time to schedule the transmission of pages at block 92, the processor 14 proceeds therefrom to block 96. At block 96, the processor 14 determines whether a limited, predetermined number of batches of pages previously scheduled for transmission have been encoded in their associated signalling protocol and coupled to one or more transmitter units 18, 20, 22 for transmission as R.F. signals or whether the paging controller 10 is in the midst of a continuing transmission.

If the processor 14 determines at block 96 that it is in the midst of a continuing transmission, the processor proceeds to block 98 to determine whether an interrupt event exists. Events may be classified into a number of categories, for example, an interrupt event, a priority event, a non-priority event, etc. An interrupt event is an event that must be dealt with as soon as possible, for example, the transmission of a synchronization signal for the FLEX signalling protocol. An example of a typical priority event is a system or protocol command that is required to be transmitted at a particular time such as a station identification that is required to be sent out five minutes before the hour, etc. Non-priority paging events are those events that can be scheduled after the scheduling of the page transmissions for the system. If the processor 14 determines at block 98 that an interrupt event has been signalled during a continuing transmission, the processor 14 proceeds to block 100 to set the current transmission to complete as soon as possible. For example, the transmission may be set to complete after the encoding and transmission of the page currently being processed. Thereafter, from block 98 or 100, the processor 14 proceeds to block 102 to send more of the current transmission and thereafter, exits the routine at block 103.

If the processor 14 determines at block 96 that it is not in the midst of a continuing transmission, the processor 14 proceeds to block 104 to determine whether an interrupt event exists. If an interrupt event does exist, the processor 14 proceeds to block 106 shown in FIG. 7 to determine whether the interrupt represents a FLEX resynchronization interrupt. If the processor 14 determines that the interrupt is a FLEX resynchronization interrupt at block 106, the processor proceeds to block 110 to schedule the transmission of a FLEX resynchronization signal. Otherwise, the processor 14 proceeds to block 108 from block 106 to suspend transmission so as to handle the interrupt event identified therein.

If the processor determines at respective blocks 96 and 104 that the previous transmission has been completed and that an interrupt does not exist, the processor 14 proceeds to block 112. At block 112 the processor 14 determines whether a priority event exists. If a priority event does exist, the processor 14 services that event at block 114 and thereafter exits the routine at block 97. If a priority event does not exist, the processor proceeds from block 112 to block 116. At block 116 the processor 14 determines whether a page is available in the paging queues 27-30 for transmission. If not, the processor proceeds to block 120 to determine whether any non-priority event exists and to service the non-priority event at block 122 if one exists. If the processor 14 determines at block 116 that a page is present in the paging queues 27-30, the processor proceeds to block 118 to schedule the transmission of up to a predetermined limited number of pages of a selected type i.e. a selected signalling protocol as discussed below with respect to FIGS. 8-12.

Figure 8:
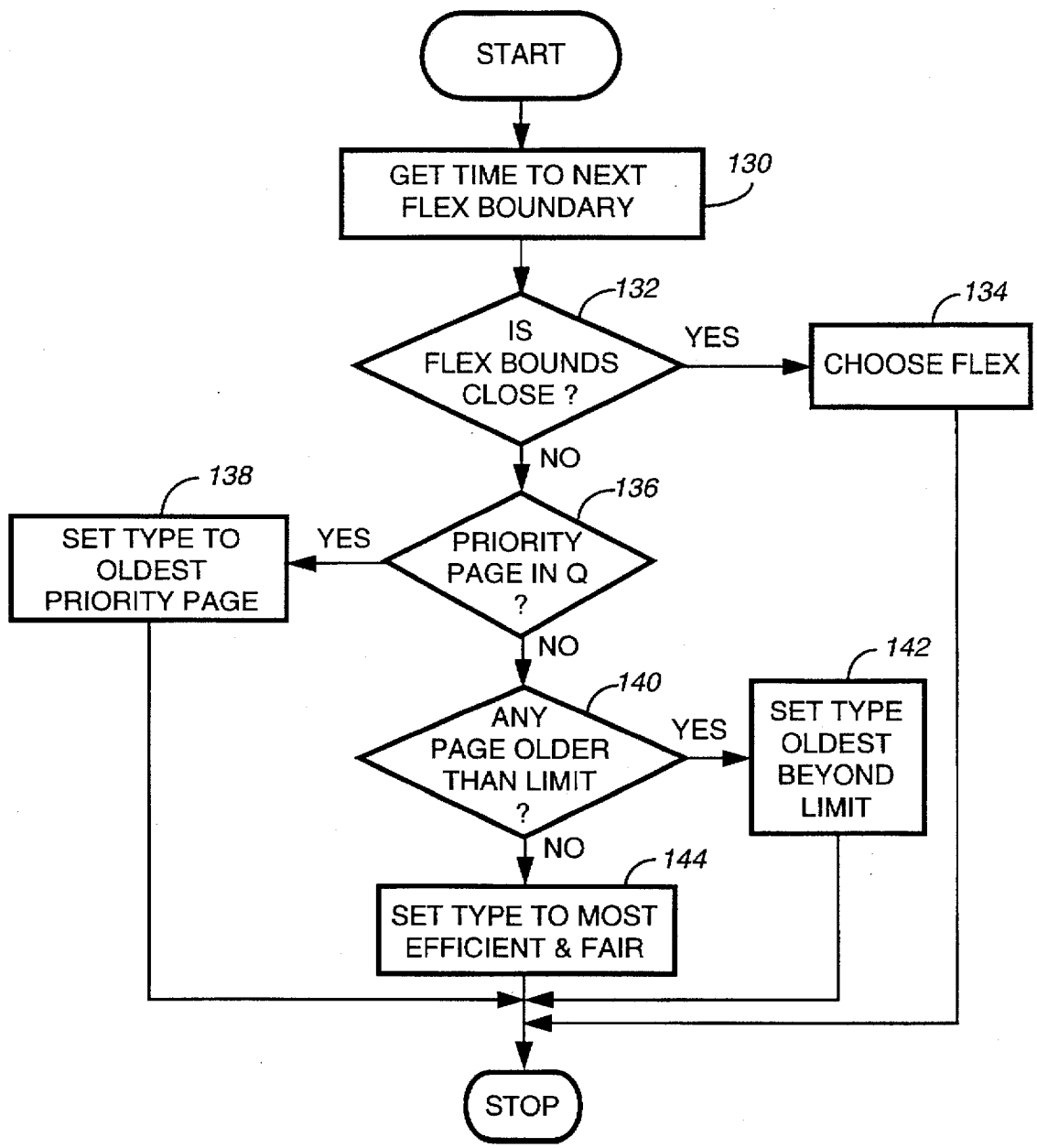
FIG. 8 is a flow chart illustrating the send paging transmission routine of FIG. 6 for choosing the type of page to be scheduled next for transmission.

The processor 14 schedules paging transmissions in accordance with a number of rules as implemented by the flow chart depicted in FIG. 8. First, frames required for synchronization of a particular protocol such as FLEX frames are sent when required. Next, if a priority page exists in the paging queues 27-30, the scheduler 32 selects as the type of the next page transmissions to be scheduled, the signalling protocol of the oldest priority page that is stored in the paging queues. If there are no priority pages, the processor 14 determines whether any page is stored in the paging queues longer than a limit value stored in the memory 16. If there is such a page, the scheduler selects as the next type of paging transmissions to be sent, the paging type of the oldest page that has been stored in the paging queues longer than the limit. Next, the scheduler chooses as the type of pages to be transmitted, the paging type of the most airtime efficient and fairest pages based upon at least one user selectable weighting parameter that weights the importance of efficiency and fairness in the selection process.

More particularly, upon entering the routine depicted in FIG. 8, the processor 14 at block 130 obtains the time remaining until the next synchronous frame such as a FLEX frame in the FLEX signalling protocol has to be transmitted. Thereafter, the processor 14 determines at block 132 whether the remaining time obtained at block 130 indicates that the time to transmit the next synchronous frame is too close. If the time until the next synchronous frame is to be transmitted is too close, the processor 14 proceeds from block 132 to block 134 to schedule for transmission pages utilizing the FLEX signalling protocol. If the FLEX synchronous frame boundary is not too close as determined at block 132, the processor 14 proceeds to block 136 to determine whether there are any priority pages in the paging queues 27-30. Priority pages are those pages that are to be transmitted before non-priority pages. If there are priority pages in the queues 27-30, the processor 14 proceeds to block 138 to select as the page type to be scheduled for transmission next, the signalling protocol of the oldest priority page that is stored in the paging queues 27-30. If there are no priority pages in the paging queues, the processor 14 proceeds from block 136 to block 140 so as to determine whether any page is stored in the paging queues longer than a predetermined limit. If there is a page stored in the paging queues longer than the predetermined limit, the processor 14 at block 142 sets the type of page to be scheduled for transmission next to the oldest page that is stored in the paging queue longer than the limit. If it is determined at block 140 that there is no page that is older than the limit, the processor 14 proceeds to block 144. At block 144, the processor 14 selects as the type of pages to be scheduled for transmission next, the type of the pages that are stored in the paging queues that can be sent most efficiently and fairly according to the flow chart depicted in FIG. 9.

Figure 9:
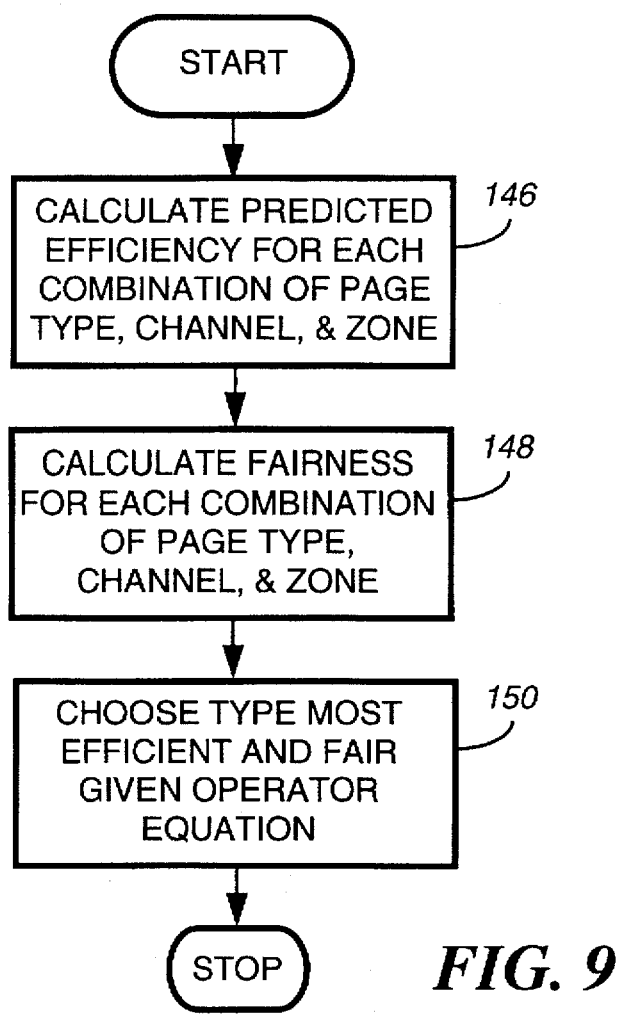
FIG. 9 is a flow chart illustrating a routine for calculating the efficiency and fairness of scheduling pages of various protocol types for transmission next as called by the routine of FIG. 8.

The processor 14, in accordance with the routine depicted in FIG. 9, calculates at block 146 an estimated efficiency for each combination of page type channel and zone in accordance with the flow chart depicted in FIGS. 10-12. discussed below, the efficiency of transmitting a particular page i.e. protocol type is based upon the number of code words of pages stored for the protocol type and further based upon the delay, if any, expected to be encountered in changing the signalling protocol from the protocol currently being used to transmit pages to the protocol type for which the efficiency is being determined. After determining the efficiency of a page type selection at block 146, the processor 14 proceeds to block 148. The processor 14 at block 148 calculates the fairness for each combination of page type, channel and zone. Specifically, the processor 14 at block 148 determines fairness based upon the age of a page as measured from the time when the page arrives in the system divided by a maximum age allowed for the particular page type i.e. signalling protocol type. Each page is considered in combination with each available R.F. channel and zone in a manner similar to depicted FIGS. 10–11 for efficiency wherein the processor 14 saves the fairness value associated with the most fair page, channel and zone combination of a particular protocol type for use at block 150. At block 150, the processor 14 determines a page transmission weight PTW as follows.

$$PTW = Eff(1-wf) + wf \text{ (age of page/max age)}$$

Where Eff is the efficiency and wf is the weighting factor. As discussed above, the (age of page/max age) represents fairness whereas efficiency is determined as described below with reference to FIG. 10. The weighting factor wf is preferably user programmable and may be formed of a predetermined value or it may be formed of a continuous function that varies, i.e. increases and/or decreases, over time. The weighting factor allows the operator to determine whether efficiency or fairness is more important or if they are of equal importance in which case the weighting factor is set equal to 0.5. After the page transmission weight, PTW, has been calculated for each of the page types, the processor 14 at block 150 selects as the next page type to be scheduled for transmission, the page type with the highest page transmission weight.

Figure 12:
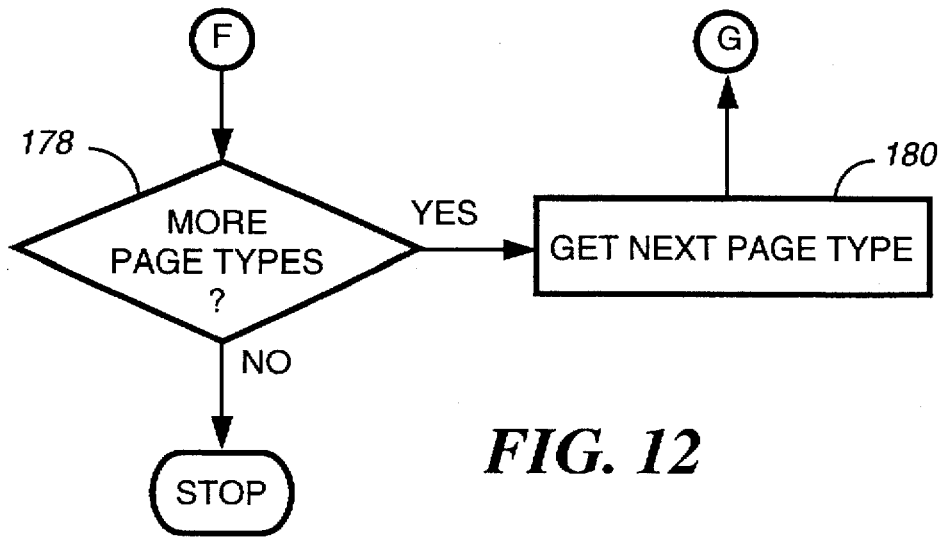
FIGS. 10–12 form a flow chart illustrating the subroutine for calculating the efficiency for each combination of page type, channel and zone.
Figure 10:
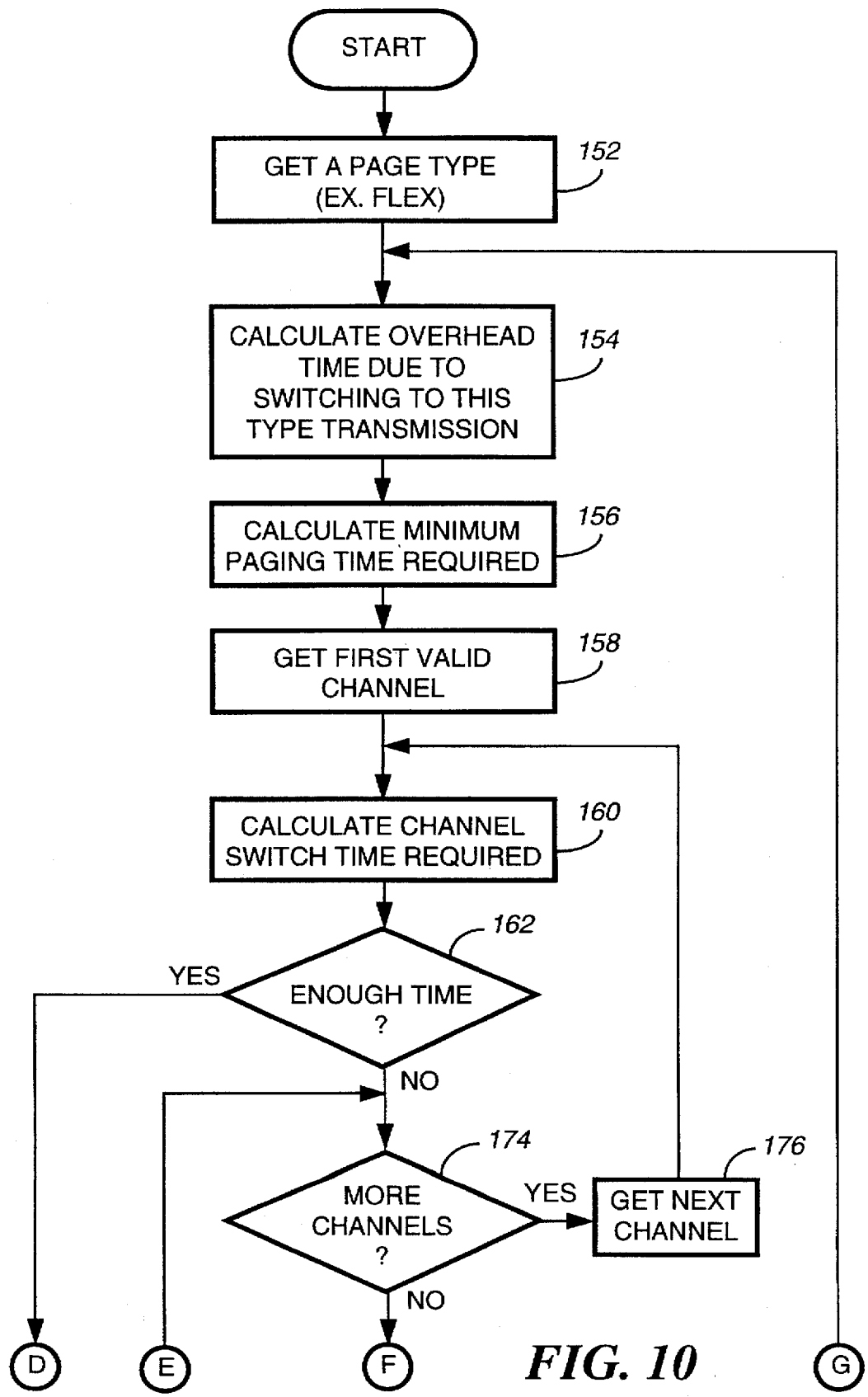
Figure 11:
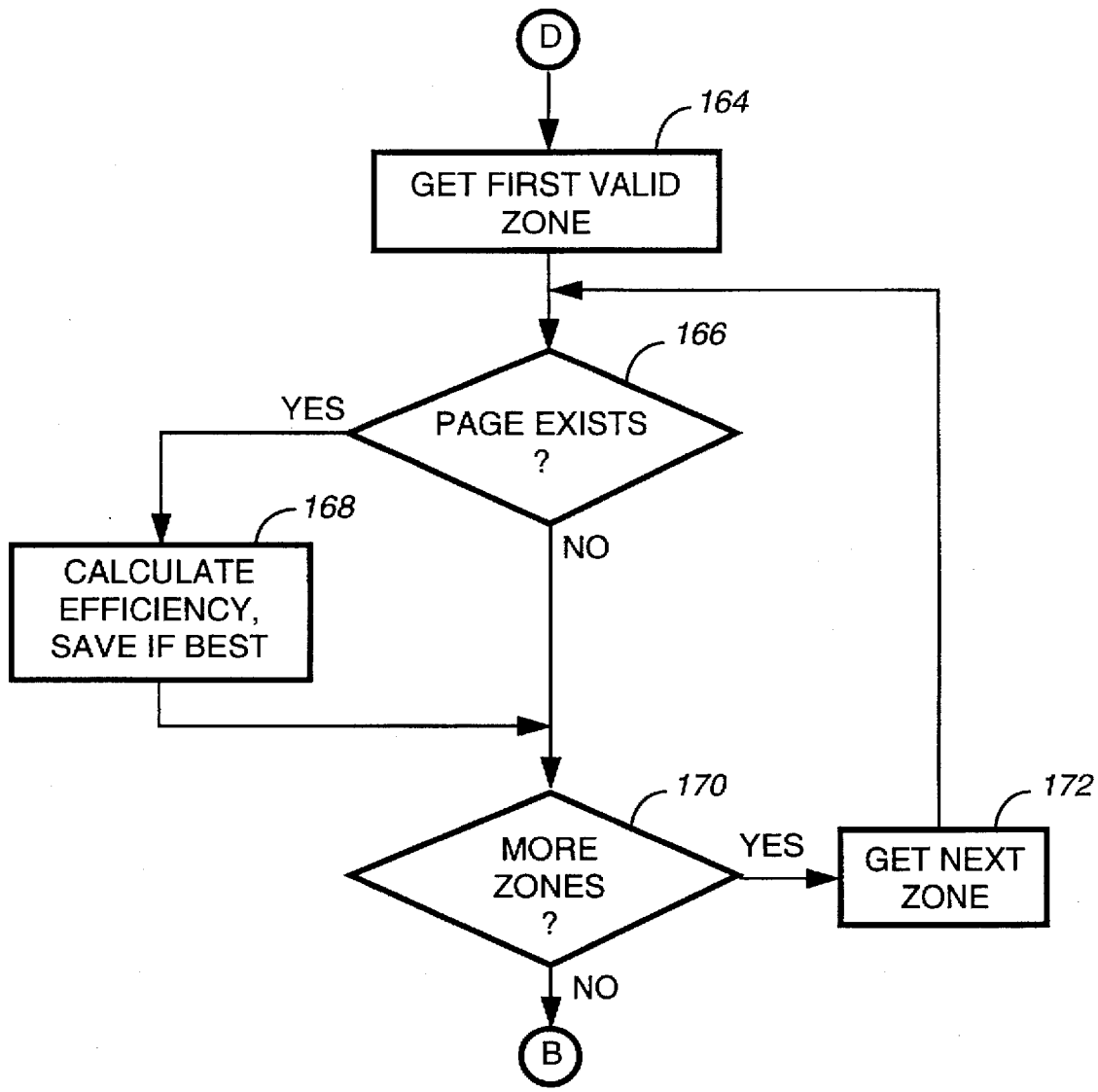

In order to determine the airtime efficiency of a page type, the processor 14 implements the routine depicted in FIGS. 10–12. At a block 152, the processor 14 determines a page type i.e. signalling protocol type, of a page in the paging queues. Thereafter, at block 154 the processor 14 determines the overhead time due to switching from the protocol type of the pages currently scheduled for transmission and/or currently being transmitted to the protocol type obtained at block 152. The overhead time is that amount of airtime that is needed to change signalling protocols prior to sending a page plus any idle code words that would have to be transmitted for that protocol type. It is noted that, if desired, a look-up table may be used to store values representing the overhead time at block 154 or, alternatively, the overhead time may be calculated. Thereafter, at a block 156 the processor 14 determines the minimum paging time required for the particular protocol wherein the minimum paging time for each protocol that is capable of being handled by the paging controller 10 has an associated minimum paging time that is stored in the memory 16. Next, at block 158 the processor 14 identifies a radio frequency channel that is available for transmitting the particular signalling protocol and thereafter proceeds to block 160. At block 160, the processor 14 calculates the overhead associated with switching the channel from the channel currently being utilized to transmit pages to the channel identified at block 158. It is noted, that the overhead at this block will be zero if the channel identified at block 158 is the current channel that is being utilized to transmit pages. Thereafter, at block 162 the processor 14 determines whether the total overhead calculated at blocks 154 and 160 plus the minimum paging time determined at block 156 is less than the time that is remaining before the next shared channel or the next FLEX boundary i.e. synchronous frame. If the calculated overhead time and minimum paging time is less than the time remaining, the processor 14 proceeds from block 162 to block 164. At block 164, the processor 14 identifies one of the zones of the system. Thereafter, at block 166 the processor 14 determines whether a page is stored in the paging queue for transmission in the zone identified at block 164. If so, the processor proceeds to block 168 from block 166 in order to determine the efficiency of transmitting the page on the channel identified at block 158 or 176 for transmission in the zone identified at block 164. Efficiency may be determined for example by dividing the paging time by the sum of the paging time plus the total overhead time wherein the paging time is represented by the number of code words in the page multiplied by the time that it takes to transmit a code word of the particular signalling protocol, i.e. the protocol identified at block 152, and where the total overhead time is as discussed above, the overhead time calculated at blocks 154 and 160. If the efficiency for a page of the particular protocol type is the highest i.e. best, calculated for that particular page type, the processor 14 saves the efficiency value for the page type at block 168. Thereafter, the processor determines at block 170 whether there is another zone to be considered. If so, at block 172 the processor 14 identifies the next zone to be considered and proceeds back to block 166 so as to determine whether there is a page stored in the paging queue for that identified zone. When the processor 14 determines at block 170 that each of the zones has been considered, the processor proceeds to block 174 to determine whether there are any more RF channels to be considered. If there are more channels to be considered, the processor 14 proceeds to block 176 to identify the next channel to be considered and thereafter, proceeds to block 160 to calculate the overhead associated with the channel identified at block 176.

Once the scheduler 32 schedules the transmission of up to the minimal number of page batches/frames of the selected paging type, the paging encoder 34 builds that minimal number of batches/frames and thereafter returns control to the scheduler 32. This enables the controller to change encoding algorithms if the scheduler 32 of the paging controller 10 determines that the next group of pages to be scheduled most efficiently and fairly is of a different protocol type. Thus, the scheduler 32 is sufficiently dynamic to change the type of pages being transmitted if pages of a different protocol type are received by the paging controller 10 and are determined to be more efficient and fair than pages of the type currently being processed for transmission. Further, the scheduler of the present invention provides a user programmable trade off between page latency i.e. the age of a page in the paging queues versus airtime efficiency. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method for scheduling a transmission of pages of a plurality of different types of paging protocols, said pages being transmitted in batches and each page including one or more code words, said method comprising:

storing pages received for transmission in accordance with the protocol type of the page;

determining the efficiency of transmitting the stored pages for each protocol type based upon the number of code words of pages of the protocol type and any delay expected to be encountered in changing to the protocol type;

determining the fairness of transmitting the stored pages for each protocol type based upon the age of pages of the protocol type;

selecting the next protocol type of pages to be scheduled for transmission based upon the efficiency and fairness determined for each of said protocol types;

scheduling up to a predetermined, limited number of batches of pages of said selected protocol type;

storing a maximum age limit;

determining, prior to the determination of efficiency and fairness, whether any of said stored pages has been stored for a length of time that exceeds said maximum age limit; and selecting as the next protocol type of pages to be scheduled for transmission, the type of protocol of a page stored for a length of time exceeding said maximum age limit if such a page is determined to be stored.

2. A method for scheduling a transmission of batches of pages of a plurality of different types of paging protocols as recited in claim 1 wherein said selecting of the next protocol type of pages to be scheduled is based upon at least one weighting factor that determines the emphasis of the selection on efficiency or fairness.

3. A method for scheduling a transmission of batches of pages of a plurality of different types of paging protocols as recited in claim 2 wherein said weighting factor is programmable by an operator.

4. A method for scheduling a transmission of batches of pages of a plurality of different types of paging protocols as recited in claim 2 wherein said weighting factor is a function that varies over time.

5. A method for scheduling a transmission of batches of pages of a plurality of different types of paging protocols as recited in claim 1 wherein said pages are scheduled for transmission over a plurality of frequency channels and a plurality of zones and said efficiency determining step determines the efficiency for each combination of page type, available channel for the page type and zone in which a page of the page type is intended to be transmitted.

6. A method for scheduling a transmission of batches of pages of a plurality of different types of paging protocols as recited in claim 1 wherein said selecting step selects the type of protocol of the page stored the longest if said length of time exceeding said maximum age limit.

7. A method for scheduling a wireless transmission of messages of a plurality of different types of signalling protocols, each of said messages having an associated length, said method comprising:

storing messages received for transmission in accordance with the protocol type of the message;

determining the efficiency of transmitting the stored messages for each protocol type based upon the length of messages of the protocol type and a delay if any expected to be encountered in changing to the protocol type;

determining the fairness of transmitting the stored messages for each protocol type based upon the length of time that messages of the protocol type have been stored;

selecting the next protocol type of messages to be scheduled for transmission based upon the efficiency and fairness determined for each of said protocol types;

scheduling up to a predetermined, limited number of messages of said selected protocol type;

storing a maximum age limit;

determining, prior to the determination of efficiency and fairness, whether any of said stored messages have been stored for a length of time that exceeds said maximum age limit; and selecting as the next protocol type of pages to be scheduled for transmission, the type of protocol of a message stored for a length of time exceeding said maximum age limit if such a message is determined to be stored.

8. A method for scheduling a wireless transmission of messages of a plurality of different types of signalling protocols as recited in claim 7 wherein said selecting of the next protocol type of messages to be scheduled is based upon at least one weighting factor that determines the emphasis of the selection on efficiency or fairness.

9. A method for scheduling a wireless transmission of messages of a plurality of different types of signalling protocols as recited in claim 8 wherein said weighting factor is programmable by an operator.

10. A method for scheduling a wireless transmission of messages of a plurality of different types of signalling protocols as recited in claim 8 wherein said weighting factor is a function that varies over time.

11. A method for scheduling a wireless transmission of messages of a plurality of different types of signalling protocols as recited in claim 7 wherein said messages are scheduled for transmission over a plurality of frequency channels and a plurality of zones and said efficiency determining step determines the efficiency for each combination of message protocol type, available channel for the protocol type and zone in which a message of the protocol type is intended to be transmitted.

12. A method for scheduling a wireless transmission of messages of a plurality of different types of signalling protocols as recited in claim 7 wherein said selecting step selects the type of protocol of the page stored the longest if said length of time exceeding said maximum age limit.

13. A system for scheduling a transmission of pages of a plurality of different types of paging protocols, each page having an associated length, said system comprising:

a memory for storing pages received for transmission in accordance with the protocol type of the page wherein said memory stores a maximum age limit;

means for determining the efficiency of transmitting the stored pages for each protocol type based upon the length of pages of the protocol type and a delay if any expected to be encountered in changing to the protocol type;

means for determining the fairness of transmitting the stored pages for each protocol type based upon the age of pages of the protocol type;

means for selecting the next protocol type of pages to be scheduled for transmission based upon the efficiency and fairness determined for each of said protocol types;

means for scheduling up to a predetermined, limited number of pages of said selected protocol type; and means for determining, prior to the determination of efficiency and fairness, whether any of said stored pages has been stored for a length of time that exceeds said maximum age limit, said selecting means selecting as the next protocol type of pages to be scheduled for transmission, the type of protocol of a page stored for a length of time exceeding said maximum age limit if such a page is determined to be stored.

14. A system for scheduling a transmission of pages of a plurality of different types of paging protocols as recited in claim 13 wherein said means for selecting the next protocol type of pages to be scheduled selects said protocol type based upon at least one weighting factor that determines the emphasis of the selection on efficiency or fairness.

15. A system for scheduling a transmission of batches of pages of a plurality of different types of paging protocols as recited in claim 14 wherein said weighting factor is programmable by an operator.

16. A system for scheduling a transmission of batches of pages of a plurality of different types of paging protocols as recited in claim 14 wherein said weighting factor is a function that varies over time.

17. A system for scheduling a transmission of pages of a plurality of different types of paging protocols as recited in claim 13 wherein said scheduling means schedules pages for transmission over a plurality of frequency channels and in a plurality of zones and said efficiency determining step determines the efficiency for each combination of page type, available channel for the page type and zone in which a page of the page type is intended to be transmitted.

18. A system for scheduling a transmission of pages of a plurality of different types of paging protocols as recited in claim 13 wherein said selecting means selects as the next protocol type of pages to be scheduled for transmission, the type of protocol of a page stored the longest if said length of time exceeds said maximum age limit.

* * * * *